United States Patent Office 3,417,054
Patented Dec. 17, 1968

1

3,417,054
ALKYLATED POLYMERS OF HETEROCYCLIC N-VINYL MONOMERS AND PROCESS OF PREPARING THE SAME

Ashot Merijan, Clark, and Frederick Grosser, Midland Park, N.J., and Eugene V. Hort, Easton, Pa., assignors to GAF Corporation, a corporation of Delaware
No Drawing. Continuation-in-part of application Ser. No. 340,786, Jan. 28, 1964. This application Nov. 18, 1965, Ser. No. 508,547
25 Claims. (Cl. 260—66)

This application is a continuation-in-part of our application Ser. No. 340,786, filed on Jan. 28, 1964 now abandoned.

This invention relates to a new, novel and useful class of alkylated polymers of heterocyclic N-vinyl monomers having solubility characteristics in a wide range of solvents, from polar to non-polar, and to the process of preparing the same.

It is known that homopolymers of heterocyclic N-vinyl monomers, especially of N-vinyl lactams, are soluble in water and in a certain class of organic solvents such as alcohols, ether-alcohols, amines, and other polar organic solvents, but insoluble in aliphatic hydrocarbons such as hexane, heptane, cyclohexane, methylcyclohexane, mineral spirits, mineral oil, lubricating oil, and other non-polar organic solvents.

Commercial requirements have arisen for homopolymers and copolymers of heterocyclic N-vinyl monomers which possess the characteristics imparted by the presence of the heterocyclic rings, but which have special solubility characteristics that are dictated by the particular end use in view. For example, polyvinylpyrrolidone, and copolymers of vinylpyrrolidone and vinyle acetate, are very effective as hair-grooming aids, but for certain applications their solubility in water is undesirable. Hence, such polymers with a lower degree of hygroscopicity and increased moisture resistance are special requirements that have been dictated by the cosmetic trade. In another instance the effectiveness of polyvinylpyrrolidone and copolymers thereof as dispersing agents in lubricating oils cannot be utilized because of their insolubility in the lubricating medium. In still another instance, the excellent adhesive properties imparted to the polymer by the lactam ring are partly vitiated because of poor moisture resistance. A further example is the inability to utilize the excellent complexing property of polyvinylpyrrolidone as a disperse dye receptor in difficult-to-dye resins such as polyethylene and polypropylene because of the insolubility of polyvinylpyrrolidone in such resins.

It is also known that polymers of N-vinyl lactams in which the regularly recurring lactam rings are substituted by one or more lower alkyl groups can be prepared by conventional polymerization procedures of lower alkyl substituted N-vinyl lactams. Monomers of the latter type, such as N-vinyl-3-butyl pyrrolidone; N-vinyl-5-methyl-5-ethyl pyrrolidone; N-vinyl-3,3,5-trimethyl pyrrolidone; N-vinyl-6-butyl piperidone; N-vinyl-7-ethyl caprolactam; N-vinyl-3,5-dimethyl caprolactam; N-vinyl-4-isopropyl caprolactam; N-vinyl-3,5,7-trimethyl caprolactam, etc., when homopolymerized, yield water soluble polymers with additional solubility in lower alcohols, nitroethane, butylamine, etc., but insoluble in hexane, kerosene, mineral oils and other aliphatic and aromatic hydrocarbons such as benzene, toluene, etc. In view of these solubility characteristics, such polymers have limited applications. For example, such polymers cannot be used in applications where waterproofness is a prime requisite. They cannot be used as thickeners in mineral oils or as gloss improvers of waxes and polishes. They are incompatible with unctuous materials and cannot be employed as emollients in cosmetics and soaps.

2

Copolymers of N-vinyl lactams and methyl acrylate, vinyl acetate, etc., are also soluble in alcohols, and to varying degrees in water, depending on the character and the amount of the comonomer contained in the copolymer. Solubility in water decreases as the non-polar nature of the comonomer increases and as the percentage of comonomer in the copolymer increases. Such copolymers are, however, insoluble in aliphatic hydrocarbons such as n-heptane, n-hexane, etc., and aromatic hydrocarbons such as benzene, toluene, xylene, etc.

It is the principal object of the present invention to provide a new class of alkylated polymers of heterocyclic N-vinyl monomers which have varying degrees of solubility in polar and non-polar solvents and which will meet the uses dictated by commercial requirements. Thus, homopolymers and copolymers of heterocyclic N-vinyl monomers are provided which are soluble in polar solvents such as alcohols, but which are much less sensitive to moisture and which are soluble in aliphatic hydrocarbons of from 6 carbon atoms up, mineral and lubricating oils, etc. In view of these solubility characteristics, the alkylated polymers prepared in accordance with the present invention, overcome the deficiencies described above.

A further object is to provide a method of preparing alkylated polymers of heterocyclic N-vinyl monomers which will possess varying degrees of solubility in polar and non-polar solvents.

Other objects and advantages will become manifest from the following description.

We have found that polymers of heterocyclic N-vinyl monomers are readily alkylated by treating one mole of a homopolymer or copolymer of a heterocyclic N-vinyl monomer with 0.05 to 10 moles of an alpha-olefin of at least 2 carbon atoms in solution of an organic solvent common to the polymer and alpha-olefin in the presence of 0.025 to 0.30 mole of an organic peroxide catalyst per mole of alpha-olefin, at a temperature ranging from 100° to 200° C. for a period of time ranging from 3 to 60 hours. The resulting solution of the alkylated polymer may be employed as such or, if desired, the organic solvent may be removed by vacuum distillation.

The homopolymers of heterocyclic N-vinyl monomers that are alkylated with an alpha-olefin of at least 2 carbon atoms in accordance with the present invention are those which contain a carbonyl function adjacent to the nitrogen in the heterocyclic moiety such as, for example, homopolymers of N-vinyl succinimide, N-vinyl diglycolylimide, N-vinyl glutarimide, N-vinyl - 3 - morpholinone, N-vinyl - 5 - methyl - 3 morpholinone, N-vinyl-5 - ethyl - 3 - morpoholinone, N-vinyl oxazolidone, etc., and N-vinyl 5-, 6- and 7-membered lactams characterized by the following formula:

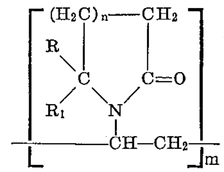

wherein R and $R_1$ are selected rom the group consisting of hydrogen, methyl and ethyl, *n* is an integer of from 1 to 3, and *m* represents the average molecular weight as determined by relative viscosity measurements which are designated as K values.

The viscosity coefficient K, which is fully described in

Modern Plastics, 23, No. 3, 157–61, 212, 214, 216 and 218 (1945) is calculated as follows:

$$\frac{\log \eta \text{ rel}}{c}=\frac{75K_0^2}{1+1.5K_{0c}}+K_0$$

and $$K=1000K_0$$

where $c$ is the concentration in grams per 100 ml. of polymer in solution and the $\eta$ rel is the viscosity of the solution compared to solvent.

Other homopolymers containing a lactam ring that are alkylated with an $\alpha$-olefin of at least 2 carbon atoms include those prepared by the homopolymerization of comparable monomers of N-vinyl 5-, 6- and 7-membered thiolactams, N-acryloyl-pyrrolidone, -piperidone and -caprolactam; N - acryloyl - 5 - methylpyrrolidone, N-acryloyl - 6 - methylpiperidone and N-acryloyl - 7 - methyl caprolactam and their corresponding 5-, 6- and 7-ethyl derivatives; N-acryloxy-methyl-pyrrolidone, -piperidone and -caprolactam; N - methacryloxy-ethyl-pyrrolidone, -piperidone and -caprolactam; N - methacryloxy - methyl-5 - methyl - pyrrolidone, -6-methyl-piperidone and -7-methyl - caprolactam; N - methacrylamidomethyl-, N-methacrylamidoethyl-, N - methacrylamidopropyl- and N-(N-phenylacrylamidopropyl) - pyrrolidones, -piperidones and -caprolactams.

The homopolymers of the N-vinyl lactams characterized by the foregoing formula are readily obtained by homopolymerizing N-vinyl pyrrolidone; N-vinyl-5-methyl pyrrolidone; N - vinyl - 5 - ethyl pyrrolidone; N - vinyl-5,5 - dimethyl pyrrolidone; N - vinyl - 5,5 - diethyl pyrrolidone and N-vinyl - 5 - methyl - 5 - ethyl pyrrolidone; N-vinyl piperidone; N - vinyl - 6 - methyl piperidone; N - vinyl - 6 - ethyl piperidone; N - vinyl - 6,6 - dimethyl piperidone; N-vinyl 6,6 - diethyl piperidone and N-vinyl-6 - methyl - 6 - ethyl piperidone; N-vinyl caprolactam, N-vinyl - 7 - methyl caprolactam; N-vinyl - 7,7 - dimethyl caprolactam; N - vinyl - 7 - ethyl caprolactam; N-vinyl-7,7 - diethyl caprolactam and N-vinyl-7-methyl-7-ethyl caprolactam.

For the purpose of the present invention we employ homopolymers of heterocyclic N-vinyl monomers having a K value ranging from about 10 to 140, preferably from about 30 to 100. These homopolymers are readily obtained by conventional homopolymerization procedures of the foregoing heterocyclic N-vinyl monomers described in U.S. Patents 2,265,450; 2,317,804; 2,335,454 and many others too numerous to mention in which working examples are given.

All of the homopolymers of N-vinyl lactams characterized by the foregoing general formula are soluble in water, alcohols, and certain class of organic solvents, but insoluble in the aliphatic and aromatic hydrocarbons of the type hereinbefore mentioned.

Copolymers obtained by copolymerizing 5 to 99 mole percent of the foregoing heterocyclic N-vinyl monomers with 1 to 95 mole percent of a monoethylenically unsaturated polymerizable monomer and having a K value from about 10 to 140 are readily alkylated in accordance with the present invention to yield products having solubility characteristics dictated by the end use.

The various monoethylenically unsaturated polymerizable monomers, which are copolymerized with any one of the aforementioned heterocyclic N-vinyl monomers in the conventional manner and which will yield copolymers that are readily alkylated in accordance with the present invention, include vinyl esters such as vinyl acetate, vinyl propionate, vinyl butyrate, vinyl isobutyrate, vinyl lactate, vinyl caproate, vinyl caprylate, vinyl oleate, and vinyl stearate; acrylonitrile; vinyl ketones; vinyl cyclohexane; styrene; 2-vinyl pyridine, 4-vinyl pyridine; acrylic acid; acrylate ester monomers of the formula $$CH_2{=}CHCOOR_2$$

wherein $R_2$ represents either a straight or branched alkyl of from 1 to 18 carbon atoms or an alkoxyalkyl in which the total number of carbon atoms in the alkyl group range from 3 to 6.

As examples of such acrylate esters the following are illustrative: methyl, ethyl, propyl, isopropyl, butyl, isobutyl, s-butyl, 2 - methyl - 1 - butyl, 3 - methyl - 1 - butyl, 2-ethyl-1-butyl, amyl, 3-pentyl, 2 - methyl - 1 - pentyl, 4 - methyl - 2 - pentyl, hexyl, 2-ethylhexyl, heptyl, 2-heptyl, octyl, 2-octyl, nonyl, 5-ethyl-2-nonyl, decyl, 2-methyl - 7 - ethyl - 4 - undecyl, dodecyl, tetradecyl, hexadecyl, octadecyl, 2-methoxyethyl , 2 - ethoxyethyl and 2-butoxyethyl acrylate; methacrylic monomers such as methacrylic acid, methyl methacrylate, cyclohexyl methacrylate, isobutyl methacrylate, isoamyl methacrylate, $\beta$-methoxy ethyl methacrylate and $\alpha$-(o-chlorophenyl) ethyl methacrylate, $\beta$ - phenoxy - ethyl methacrylate, $\alpha$-phenylethyl methacrylate, phenyl methacrylate, o-cresyl methacrylate, p - cyclohexylphenyl methacrylate, 2 - nitro - 2-methyl propyl methacrylate, diethylaminoethyl methacrylate, ethylidene acetate methacrylate and glycidyl methacrylate, including esters of halo acrylic acids, such as methyl - 2 - chloro-acrylate, ethyl-$\alpha$-chloro-acrylate, phenyl - $\alpha$ - chloro - acrylate, $\alpha$-ethylacrylic acid; methacrylonitrile; N-alkyl and N-aryl substituted acrylamides such as N-methyl acrylamide, N-ethyl acrylamide, N-propyl acrylamide, N-n-butyl acrylamide, N-n-dodecyl acrylamide, N-n-octadecyl acrylamide, N,N - dimethyl acrylamide, N,N - diethyl acrylamide, N,N - di - n - butyl acrylamide, N,N - di - isobutyl acrylamide, N-cyclohexyl N,N-dicyclohexyl acrylamide, N-phenyl acrylamide, N-acrylamide, N-p-nitro-phenyl acrylamide, N-$\alpha$-naphthyl acrylamide, N - $\beta$ - naphthyl acrylamide, N-methyl-N-phenyl acrylamide, N,N-diphenyl acrylamide, N-benzyl acrylamide, N,N - di - benzyl acrylamide; and grafted monomers of the type disclosed in U.S. Patents 3,029,-219, 3,035,009, 3,036,033, and the like.

A mixture consisting of from 5 to 99 mole percent of any one of the foregoing heterocyclic N-vinyl monomers and from 1 to 95 mole percent of a different heterocyclic N-vinyl monomer, such as, for example, N-vinyl lactam with either N-vinyl succinimide, N-vinyl-3-morpholinone, and the like, may also be copolymerized and the resulting copolymer alkylated in accordance with the present invention.

It is to be noted that any copolymer containing not less than 5 mole percent of the heterocyclic N-vinyl monomer and which is soluble in the organic solvent is readily alkylated in accordance with the present invention. From our numerous experiments connected with the present invention, we found that the configuration of the foregoing monoethylenically unsaturated monomers, and numerous others, is immaterial since they all copolymerize in the aforementioned proportions with the heterocyclic N-vinyl monomers and yield copolymers which are soluble in the organic solvent or mixture thereof and which are readily alkylated.

Where insolubility in water is desired, it is preferred that a copolymer be employed in which the heterocyclic N-vinyl monomer enumerated above be present in an amount not less than 5 mole percent, based on the moles of said copolymer. Copolymers prepared within this minimum range of the heterocyclic N-vinyl monomer will contain sufficient active protons in the heterocyclic rings for alkylation to yield alkylated polymers which are insoluble in water, but soluble in organic non-polar solvents of the type in which the parent copolymer was initially insoluble.

Since the polymers (homopolymers and copolymers) of the foregoing N-vinyl 5-, 6- and 7-membered lactams are preferred because of lower costs and commercial availability, the alkylation process of the present invention will be described with particular reference to such polymers.

It is to be noted at the outset that any α-olefin having a molecular weight from about 28 to as high as 2500 may be employed in the alkylation of the homopolymers and copolymers of N-vinyl lactams. In other words, α-olefins ranging from ethene (ethylene) to as high as polybutenes having molecular weights from 400 to 2500 may be employed. As examples of such α-olefins the following are illustrative: ethene; propene; 1-butene; 1-pentene; 2-ethyl-1-butene; 2-methyl-1-pentene; 1-hexene; 5-methyl-1-hexene; 2-methyl-1-pentene; 1 - hexene; 5-methyl-1-hexene; 2-methyl-1-pentene; 3-ethyl-1-pentene; 1-heptene; 1-octene; 1-nonene; 2-ethyl-1-hexene; 1-decene; 1-dodecene; 1-tetradecene; 1-hexadecene; 1-heptadecene; 1-octadecene; 1-nonadecene; 1-eicosene; 1-docosene; 1-tetracosene; 1-pentacosene; trimerized α-tetradecene and polybutenes of molecular weight of 400 to 2500 may be used.

While linear α-olefins are preferred because of their commercial availability, numerous isomers of α-olefins ranging from 1-pentene to 1-pentacosene as well as polybutenes may also be employed in the alkylation reaction. The only precaution required in such case is that the isomer contain an ethylenic unsaturation in the α-position thereof.

Instead of employing any one of the foregoing individual α-olefins, a mixture of commercially available linear α-olefins produced by cracking petroleum wax or by polymerizing lower olefins may also be used as the alkylating agent. Alpha-olefins in the carbon range of from $C_6$–$C_7$; $C_7$–$C_9$; $C_9$–$C_{11}$; $C_{11}$–$C_{15}$; and $C_{15}$–$C_{20}$ are commercially available and contain from 81 to 87 weight percent of straight-chain α-olefins; from 0.5 to 1 weight percent of straight-chain internal olefins; from 0.5 to 3 weight percent of branched and naphthenic olefins; from 1 to 4 weight percent of paraffins and naphthenes and from 1 to <1 of aromatics, respectively. A mixture of α-olefins containing from 65–75% of α-olefins of from $C_{20}$ to $C_{42}$ carbon atoms having an average molecular weight of 366 is also commercially available and such mixture is employed in the alkylation reaction.

As noted above, an organic solvent is employed in the alkylation reaction which is common to the polymer (homo or co-polymer) and alpha-olefin(s). As solvents, various alcohols, such as methanol, ethanol, propanol, isopropanol, butanol, sec-butanol, amyl alcohol, hexanol, 2-ethyl-1-hexanol, ethylene glycol, 1,2-butanediol, 4-butanediol, etc., may be employed. Other inert solvents such as diethylene glycol, ethylene glycol monomethyl ether and the like may also be employed. It is to be noted that the nature or character of the organic solvent is immaterial so long as it forms a solution with the polymer and alkylating alpha-olefin(s) and is not susceptible to alkylation.

As peroxide catalyst (initiator) for the alkylation reaction, any one of the known tertiary-alkyl organic peroxides and hydroperoxides such as, for example, di-t-butyl peroxide, t-butyl perbenzoate, di-t-butyl peroxide, t-butyl perbenzoate, di-t-butyl perphthalate, t-butyl-pentamethylethyl peroxide, t-butyl-triphenylmethyl peroxide, di-t-amyl peroxide, bis-(triethylmethyl) peroxide, bis-(triphenylmethyl) peroxide, 2,5-dimethyl-hexyl-2,5-dihydroperoxide, 2,5-dimethyl-2,5-di(t-butyl peroxy) hexane, 2,5-dimethylhexyl-2,5-di(peroxy benzoate), t-butyl hydroperoxide, para-menthane hydroperoxide and the like may be used.

Instead of employing ethylene (ethene) and other lower α-olefins as the alkylating agents, monohalo-α-olefins and polyhalo-α-olefins of at least two carbon atoms such as, for example, dichlorovinylidene fluoride

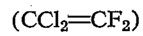
$(CCl_2{=}CF_2)$ chlorovinylidene fluoride ($CHCl{=}CF_2$), chlorotrifluoroethylene ($CClF{=}CF_2$), tetrafluoroethylene ($CF{=}CF_2$), tetrachloroethylene ($CCl_2{=}CCl_2$), vinylidene fluoride ($CH_2{=}CF_2$), vinylidene bromochloride, i.e., 1-bromo-1-chloroethylene ($CH_2{=}CBrCl$), vinylidene bromofluoride ($CH_2{=}CBrF$), vinylidene chlorofluoride

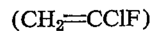
$(CH_2{=}CClF)$ 1,2-dichloro-1,2-difluoroethylene ($CClF{=}CClF$), 1,2-difluoroethylene ($CHF{=}CHF$), 1-chloro-2-fluoroethylene ($CHF{=}CHCl$), 1-bromo-2-fluoroethylene

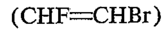
$(CHF{=}CHBr)$ 1-dichloro-2-fluoroethylene ($CHF{=}CCl_2$), 1-bromo-1,2-difluoroethylene ($CHF{=}CBrF$), 1-dibromo-2-fluoroethylene ($CHF{=}CBr_2$), trichloroethylene ($CHCl{=}CCl_2$), 1-chloro-1,2-dibromoethylene ($CHBr{=}CBrCl$), trifluoroethylene ($CF_2{=}CHF$), tribromoethylene ($CHBr{=}CBr_2$), 1-bromo-2-difluoroethylene ($CF_2{=}CHBr$), 1-chloro-1-bromo-2-difluoroethylene ($CF_2{=}CBrCl$), 1-dibromo-2-difluoroethylene ($CF_2{=}CBr_2$), 1-dichloro-2-difluoroethylene ($CF_2{=}CCl_2$), chlorotrifluoroethylene

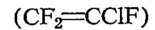
$(CF_2{=}CClF)$ 1-bromo-2-fluoroethylene ($CHF{=}CHBr$), 1-chloro-2-difluoroethylene ($CF_2{=}CHCl$), 1-dichloro-2-difluoroethylene ($CF_2{=}CCl_2$), bromotrifluoroethylene ($CF_2{=}CBrF$), fluorotrichloroethylene ($CCl_2{=}CClF$), trichloroiodoethylene ($CCl_2{=}CClI$), chlorodiiodoethylene ($CHCl{=}CI_2$), 1,2-dichloro-1,2-diiodoethylene ($CClI{=}CClI$), 1-bromo-2-iodoethylene ($CHI{=}CHBr$), 1-iodo-2-chloroethylene ($CHCl{=}CHI$), vinyl chloride ($CH_2{=}CHCl$), vinyl fluoride ($CH_2{=}CHF$), allyl chloride ($CH_2{=}CH{-}CH_2Cl$), 4-chloro-1-butene ($CH_2{=}CH{-}CH_2{-}CH_2Cl$), 3,3,4,4,4-pentafluoro-1-butene ($CH_2{=}CH{-}CF_2{-}CF_3$), 5-chloro-1-pentene ($CH_2{=}CH{-}CH_2{-}CH_2{-}CH_2Cl$), 3,3,4,4,5,5,5 - heptafluoro-1-pentene ($CH_2{=}CH{-}CF_2{-}CF_2{-}CF_3$), 3,3,4,4,5,5,6,6,6-nonafluoro-1-hexene

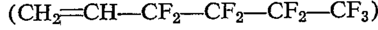
$(CH_2{=}CH{-}CF_2{-}CF_2{-}CF_2{-}CF_3)$ etc., may be used to yield a series of a new class of monohaloalkylated and polyhaloalkylated homopolymers and copolymers of the N-vinyl 5-, 6- and 7-membered lactams.

Where low-boiling alpha-olefins of from 2 to 7 carbon atoms and the monohalo- and polyhalo-α-olefins are employed as the alkylating agents and where low-boiling alcohols are employed as organic solvents, the organic peroxide initiator and the solution of the polymeric N-vinyl lactam (homo- or co-polymer) are added into a stainless steel rocker bomb. The low-boiling alpha-olefin or the monohalo- or polyhalo-α-olefin is then charged to the bomb and the bomb heated and maintained at the same temperature and period of time as noted above. The pressure developed in the bomb may range from 50 to 600 p.s.i.g. After cooling the contents of the bomb to room temperature, they are discharged into any suitable distillation equipment to remove the solvent, if so desired, and the residual product recovered either as a solid, or viscous fluid.

However, where it is desired that the alkylated polymer (homo- and co-polymer) be obtained in solution of a high-boiling aliphatic liquid hydrocarbon, the reaction mixture is subjected to vacuum distillation and the removed organic solvent is simultaneously replaced by a saturated aliphatic hydrocarbon having a boiling point higher than the organic solvent. After the organic solvent has been removed, there is obtained a solution of the alkylated polymer in solution of the aliphatic hydrocarbon. Saturated aliphatic hydrocarbons having a boiling point higher than the organic solvent employed are legion and commercially available. Hence no difficulty should be encountered in the selection of such hydrocarbon in preparing a solution of the alkylated polymeric N-vinyl lactam.

The degree, or more accurately, the efficiency of alkylation obtained by the foregoing procedure is expressed by the percent moles of the alpha-olefin of at least two carbon atoms or the monohalo- or polyhalo-α-olefin consumed during the alkylation reaction and may range from as low as 50% to 100%.

Mono-alkylation predominantly takes place when a high molar ratio of polymeric N-vinyl lactam to alpha-olefin of at least 2 carbon atoms or monohalo- or polyhalo-α-olefin is employed in the alylation reaction. When 0.05 to 0.1 mole of alpha-olefin is employed per mole equivalent of polymeric N-vinyl lactam, in the alkylation reaction, predominantly mono-alkylation takes place at random positions in the lactam moiety of the polymer yielding isomeric 1:1 adducts. In other words, the mono adducts (1:1) are isomeric with respect to the position of the addition or graft (alkylation). For example, with a homopolymer of N-vinyl lactam, random mono-alkylation takes place on the carbon atoms alpha and omega to the carbonyl and alpha-vinyl carbon atom of the lactam moiety in said polymer in the following manner:

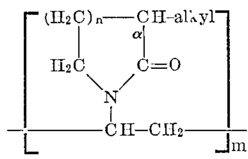

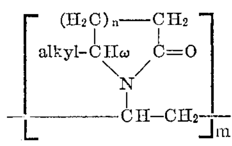

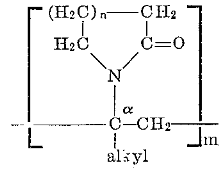

Where the polymeric N-vinyl lactams contain 1 or 2 alkyl groups of from 1 to 2 carbon atoms in omega position to the carbonyl in the lactam moiety, randon mono-alkylation does not take place in this position. In such case the mono-alkylation takes place on the carbon atom alpha to the carbonyl and alpha vinyl carbon atom of the lactam moiety.

When 0.1 to 10 moles of α-olefin of at least 2 carbon atoms are employed per mole equivalent of polymeric (homo- and co-polymer) N-vinyl lactam, random mono-alkylation, di-alkylation, tri-alkylation as well as poly-alkylation take place at the aforementioned positions of the lactam moiety of the polymer chain.

Di-alkylation and tri-alkylation are exemplified by the following illustrations:

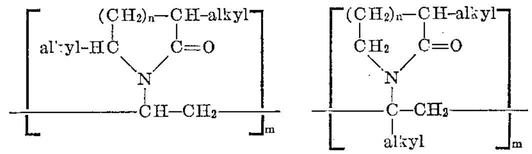

Di-alkylation

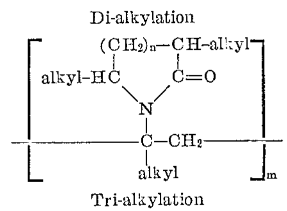

Tri-alkylation

Since propagation occurs at a given alkylation site, i.e., one or more additional moles of α-olefin add to the first mole of α-olefin which has added to the lactam moiety, such propagation is termed polyalkylation as distinguished from mono-, di- and tri-alkylation. The tendency towards polyalkylation (propagation) increases as the ratio of α-olefin to lactam moiety increases and as the chain length of the α-olefin decreases. For example, when alkylating the polymeric N-vinyl lactam with ethylene, the molar ratio of ethylene propagated in the same positions as above described for the isomeric 1:1 adducts may range from 3:1, 4:1, 5:1 to 6:1. The 4:1 propagation is exemplified by the following illustration:

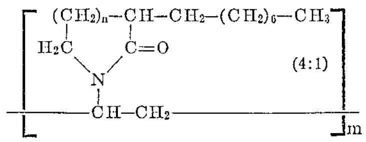

With 1 mole of polymeric N-vinyl lactam and from 0.1 to 10 moles of 1-butene, substitution at the above-described positions takes place to yield a butyl, or octyl or dodecyl group in the lactam moiety of the polymer chain.

When as little as 0.05 mole of alpha-olefin of at least 2 carbon atoms is employed per mole equivalent of a polymeric (homo- and co-polymer) N-vinyl lactam, at least 2.5% to as high as 5% of the lactam moieties of the polymer contain an alkyl substituent of at least two carbon atoms and which substituent is present on at least 1 of the carbon atoms alpha and omega to the carbonyl and alpha-vinyl carbon atom of the lactam moiety in said polymer.

When one mole of alpha-olefin of at least 2 carbon atoms is employed per mole equivalent of polymeric (homo- and co-polymer) N-vinyl lactam at least 50% to as high as 100% of the lactam moieties of the polymer will contain an alkyl substituent of at least 2 carbon atoms and which substituent is present on at least 1 of the carbon atoms, alpha and omega to the carbonyl and alpha-vinyl carbon atom of the lactam moiety in said polymer.

When 10 moles of alpha-olefin of at least 2 carbon atoms are employed per mole equivalent of polymeric (homo- and co-polymer) N-vinyl lactam, 100% of the lactam moieties of the polymer will contain an alkyl substituent of at least 2 carbon atoms and which substituent is present on at least one or more of the carbon atoms alpha and omega to the carbonyl and alpha-vinyl carbon atom of the lactam moiety in said polymer.

When 1 to 4 moles of an alpha-olefin of from at least 6 carbon atoms are employed per mole equivalent of polymeric (homo- and co-polymer) N-vinyl lactam, from 50% to 100% of the lactam moieties of the polymer will contain an alkyl substituent of at least 6 carbon atoms and which substituent is present on at least 1 of the carbon atoms alpha and omega to the carbonyl and alpha-vinyl carbon atom of the lactam moiety in said polymer. Such alkylated polymers (homo- and co-polymers) are the new products which possess the varying degrees of solubility in polar and non-polar solvents, but insoluble in water, and which find many new and useful applications as will be pointed out hereinafter.

When co-polymers containing 99 to 5 mole percent of N-vinyl lactam are alkylated with as little as 0.05 mole of alpha-olefin of at least 6 carbon atoms per mole equivalent of co-polymer, a minimum of 2.5 to 5% to as high as 50 to 100% of the lactam moieties in the co-polymer will contain an alkyl substituent of at least 6 carbon atoms and which substituent is present on at least 1 of the carbon atoms alpha and omega to the carbonyl and alpha-vinyl carbon atom of the lactam moiety in said copolymer. Such alkylated copolymers are insoluble in water but soluble in a variety of polar and non-polar solvents.

The foregoing percentages are based on experimental results which indicate a range of from 50% to as high as 100% consumption of the alpha-olefins during the alkylation reaction.

The determinations of the extent of polyalkylation (propagation), the positioning of the isomeric mono-alkyl groups in the aforementioned 1:1 adducts and the di-alkyl and tri-alkyl groups in the lactam moieties of the polymeric N-vinyl lactams were made from thermal degradation studies while employing elemental analysis, vapor phase chromatography (VPC), infra-red (IR), and nuclear magnetic resonance (NMR) data, respectively, to characterize the degradative products.

From the foregoing findings, it will be readily appreciated, depending upon the molar ratio of the reactants, that alkylated polymeric N-vinyl lactams are obtained in which one or more of the carbon atoms alpha and omega to the carbonyl and alpha-vinyl carbon atom of the lactam moiety constituting the polymer contain at least one alkyl group of at least 2 carbon atoms. With an alpha-olefin mole ratio of 3 to 4 per mole equivalent of polymeric N-vinyl lactam free from lower alkyl substituents as designated by the values R and $R_1$ above, alkylated polmeric N-vinyl lactams are obtained in which one or more of the three positions in the lactam moiety will contain an alkyl group of at least 2 carbon atoms to as many carbon atoms as is contained in the alpha-olefin employed in the alklation reaction.

In addition to the alkylated polymers as above described, there is obtained from about 0.1 to 5% of a homopolymer of the alpha-olefin employed in the alkylation reaction as determined by thermal gravimetric analysis (TGA). Since the homopolymer of the alpha-olefin is also soluble in the same solvents as the alkylated polymer, it cannot be removed. The presence of such a small amount, however, does not detract in any way from the new uses to which the alkylated polymers are put.

The alkylated polymeric N-vinyl lactams differ in solubility characteristics from conventional polymeric N-vinyl lactams, i.e., (1) those prepared by homopolymerizing N-vinyl lactams which do not contain from 1 to 2 alkyl groups of from 1 to 2 carbon atoms in the lactam moiety and (2) those which contain 1 to 2 of such alkyl groups in the lactam moiety, in that the latter two are soluble in water but insoluble in aliphatic and aromatic hydrocarbons, mineral oil, petroleum ether, ethyl ether, etc., whereas the alkylated polymers obtained in accordance with the present invention and containing at least one alkyl group of from 6 carbon atoms up in the lactam moiety are insoluble in water, but soluble in aliphatic and aromatic hydrocarbons such as n-hexane, n-heptane, benzene, toluene, kerosense, mineral oils, and in petroleum ether, ethyl ether, etc. The same applies to copolymers of the conventional N-vinyl lactams and other monoethylenically unsaturated polymerizable monomers. For example, copolymers of 65 mole percent of vinyl pyrrolidone and 35 mole percent of vinyl acetate and 60 mole percent of vinyl pyrrolidone and 40 mole percent of methyl acrylate are partially soluble in water, but insoluble in carbon tetrachloride, n-hexane, benzene, toluene, kerosene, petroleum ether, ethyl ether, mineral oils, etc. Such copolymers when alkylated with an α-olefin of at least 6 carbon atoms, so that at least 50% of the lactam moieties contain at least one alkyl group of 6 carbon atoms, are insoluble in water but soluble in the same organic solvents.

The average molecular weights of the alkylated polymers vary from 10,000 (K15–21) to about 1,000,000 (K140–150) depending upon the efficiency of the alkylation, the number of carbon atoms in the alpha-olefin employed, and upon the molecular weight of the polymeric N-vinyl lactam employed. As the number of carbon atoms in the alpha-olefin increases, the average molecular weight increases progressively. The ease of solubility in aliphatic and aromatic hydrocarbons also increases as the chain length of the α-olefin increases from 6 carbon atoms up.

Thermo studies of the various alkylated polymers show that an increase of alpha-olefin consumption from 50% up during the alkylation reaction is accompanied by a decrease in the softening point of the alkylated polymer.

The following examples will show how the various polymeric N-vinyl lactams are alkylated. All parts given are by weight unless otherwise noted. The apparatus employed in the examples, except Examples V to VII and XIV, consisted of a 1-liter, four-necked flask equipped with stirrer, thermometer, nitrogen inlet and reflux condenser. The flask containing the reactants may be purged, if desired, with nitrogen prior to heating.

For the sake of brevity, the homopolymers of N-vinyl pyrrolidone and the lubricating oil of paraffinic stock having a Saybolt viscosity of 100 seconds marketed by Socony Mobil Oil Company as "100 sec. solv. ±," will be referred to hereinafter as "PVP" and "100 sec. solvent," respectively.

EXAMPLE 1

PVP K–90 (30 grams, 0.27 equivalent) was dissolved in 225 mls. of hexanol, and then 75.7 grams (0.27 m.) of α-eicosene and 4.0 grams (0.027 m.) of di-t-butyl peroxide added. The flask containing the resulting mixture was purged with nitrogen and heated for 41 hours at 125–130° C. with agitation. The final solution was subjected to vacuum distillation and 106 grams 100 sec. solvent were added as the hexanol was removed. A total of 220 mls. of solvent was recovered, corresponding to 97.8% of hexanol. The clear reside (20.9 grams), which solidified slowly on standing to a soft waxy solid, contained 12.4% by weight of solution of unreacted α-eicosene, indicating 65.4% alkylation based on the α-eicosene employed.

In determining the average mole percent of the lactam moieties that were alkylated, the following equation was used in this and subsequent examples:

The average mole percent of lactam moieties alkylated (grafted) equals $$\frac{\text{Moles of } \alpha\text{-olefin used (percent of olefin reacted} - \text{max. percent of olefin homopolymerized}) \times 100}{\text{Moles of lactum employed}}$$

Applying the equation to Example 1, the following results were obtained:

$$\frac{0.27(65.4\% - 54.4\% \times 5\%) \times 100}{0.27} = 62\%$$

The soft waxy solid is soluble in aliphatic and aromatic hydrocarbons, such as pentane, benzene, toluene; alcohols such as butanol, hexanol, etc.; halogenated hydrocarbons such as tetrachloroethylene and the like.

EXAMPLE II

PVP K–90 (55.5 grams, 0.5 equivalent) was dissolved in 300 mls. of hexanol and then 98.0 grams (0.35 mole) of α-eicosene and 7.5 grams (0.051 mole) of di-t-butyl peroxide added. The flask containing the resulting mixture was purged with nitrogen and heated for 49 hours at 125–130° C. with agitation. After cooling, 154.0 grams of 100 sec. solvent were added and the contents subjected to vacuum distillation. A total of 295 mls. of solvent corresponding to 98.3% of the original hexanol was recovered. The clear liquid residue, which solidified slowly on standing to a soft waxy solid weighing 306.4 grams, contained 7.34% by weight of solution of unreacted α-eicosene indicating 77% akylation based on the α-eicosene used.

The resulting waxy solid is insoluble in water, but soluble in the solvents employed in Example I.

EXAMPLE III

PVP K–30 (55.5 grams, 0.5 equivalent) was dissolved in 150 grams of hexanol. Then 87 grams (0.377 mole) of a mixture consisting of 66% by weight of α-hexadecene and 34% by weight of α-octadecene and 5.1 grams (0.035 mole) of di-t-butyl peroxide added. The flask containing the resulting mixture was purged with nitrogen and heated for 19 hours at 125–130° C., followed by a second addition of 2.6 grams of peroxide and heating for another 13 hours. The resulting solution contained only 3.4% by weight of the solution of unreacted mixed hexadecene and octadecene corresponding to 88.2% alkylation with respect to the α-olefin mixture used.

After stripping off the hexanol under vacuum, a very viscous pale yellow fluid was obtained which is insoluble in water, but soluble in all non-polar solvents such as, heptane, toluene, ethyl ether, halogenated hydrocarbons, and the like. Based on the structural studies of the alkylated polymer and its thermally degraded products by VPC, IR, NMR and elemental analysis, the 65.4% of the pyrrolidone moieties alkylated on the average (calculated by the equation of Example I) showed the following isomeric distribution of the alkyl groups:

| | Percent |
|---|---|
| 3-position of the pyrrolidone moiety | 79–80 |
| 5-position of the pyrrolidone moiety | 15–10 |
| α-Vinyl carbon atom of the pyrrolidone moiety | 15–10 |

EXAMPLE IV

PVP K–90 (55.5 grams, 0.5 equivalent) was dissolved in 300 mls. of hexanol, and after the addition of 102 grams (0.375 mole) of 1-octadecene and 5.5 grams (0.0375 mole) of di-t-butyl peroxide the mixture was heated at 125–130° C. for 5 hours. Then a second addition of 5.5 grams of peroxide was made and the solution heated for another 19 hours. To the cooled mixture 160 grams of 100 sec. solvent were added and the hexanol stripped under vacuum. A total of 298 mls. of hexanol was recovered corresponding to 99.4% recovery. The clear residue, a light colored viscous fluid, weighed 318.3 grams and analyzed 5.39% by weight of solution of unreacted octadecene, indicating an 83.2 alkylation based on the 1-octadecene used.

The viscous fluid is insoluble in water, but soluble in all non-polar solvents.

EXAMPLE V

PVP K–30 (111.0 grams, 1.0 equivalent) was dissolved in 250 grams of anhydrous ethanol and then 14.6 grams (0.1 mole) of di-t-butyl peroxide added and the solution transferred into a one-liter stainless steel rocker bomb. Chlorotrifluoroethylene ($CClF{=}CF_2$), 60.0 grams (0.51 mole) was then charged to the bomb and the bomb heated and maintained at 120°–130° C. for 24 hours. After cooling, the contents were discharged into a one-liter, four-necked flask and subjected to vacuum stripping using an oil bath to remove solvent and light boiling components. The dry solid obtained as residue analyzed for 13.3% of fluorine and 7.7% of chlorine corresponding to 27% of chlorotrifluoroethylene by weight of the solid product, indicating that 71% of the chlorotrifluoroethylene was consumed in the reaction.

The solid product has a much lower water sensitivity than the parent PVP. It is soluble in alcohols, ketones, halogenated hydrocarbons, amides, and the like.

EXAMPLE VI

PVP K–30 (222 grams, 2.0 equivalents) and 30.0 grams (0.2 mole) of di-t-butyl peroxide were dissolved in 300 grams of anhydrous ethanol and the solution transferred into a one-liter stainless steel rocker bomb. Then 70 grams of 1-propene were charged to the bomb and the latter heated and maintained at 125°–130° C. for 16 hours. The contents of the bomb, after cooling, were discharged into a one-liter, four-necked flask and heated under reflux for one hour to remove unreacted propene. The clear solution, thus obtained, showed a gain of 69.0 grams in weight.

After stripping off the ethanol in a vacuum oven, the 100% product obtained was a hard glossy solid. It analyzed 9.65% for nitrogen, indicating 23.4% by weight of the product as propylene graft on the pyrrolidone moieties. The product is partially soluble in water forming a hazy solution. It is, however, soluble in all the solvents in which the parent polymer is soluble, i.e., alcohols, halogenated hydrocarbons, Freons, ketones, etc.

EXAMPLE VII

Di-t-butyl peroxide (19.5 grams, 0.13 mole) was added to 500 grams of a 50% by weight ethanol solution of 60% N-vinyl-2-pyrrolidone and 40% vinyl acetate copolymer of a K value of 30 and the solution transferred into a one-liter stainless steel rocker bomb. Butene-1 (65 grams) was charged into the bomb and the latter heated and maintained at 125°–130° C. for 16 hours. The contents of the bomb, after cooling, were discharged into a one-liter, four-necked flask and heated under reflux for one hour to drive off unreacted butene. The clear pale yellow solution showed a gain of 48 grams.

After the total removal of ethanol in a vacuum oven, a hard transparent solid was obtained. It analyzed 6.30% for nitrogen, indicating 16.6% by weight of the product as butene graft on the vinyl lactam copolymer. The product is soluble in all alcohols, halogenated hydrocarbons, ketones, etc., but insoluble in water.

EXAMPLE VIII

PVP K–30 (78.0 grams, 0.7 equivalent), 10.85 grams (0.056 mole) of t-butyl perbenzoate and 78.5 grams (0.56 mole, 23.9% of total weight) of 1-decene were dissolved into 150 grams of hexanol and the resulting solution heated and maintained at 110°–125° C. for 24 hours with a second addition of 10.85 grams of peroxide during the reaction. The mixture at the end of the reaction period analyzed for 10.75% by weight of the solution of unreacted decene indicating a 65% alkylation (grafting) based on the 1-decene employed. In other words, the product has on the average 49.5% of the pyrrolidone moieties an alkyl group of 10 carbon atoms.

The hexanol and unreacted decene were stripped in vacuum. The product was a very viscous fluid while hot and solidified to a hard glossy solid on cooling to room temperature. It is insoluble in water, forming a stable emulsion. It is soluble, however, in aliphatic and aromatic hydrocarbons, halogenated hydrocarbons, ketones, esters and alcohols.

EXAMPLE IX

PVP K–30 (55.5 grams, 0.5 equivalent) was dissolved in 100 grams of n-amyl alcohol. Thereafter 15 grams (0.1 mole) of di-tertiary butyl peroxide and 56 grams (0.4 mole) of 1-decene were added and the solution heated at reflux for 20 hours and then analyzed. The residual 1-decene was 2.2% by weight of the reaction solution, corresponding to 91% alkylation based on the 1-decene. After stripping off the solvent and unreacted 1-decene in vacum, a clear solid was obtained at room temperature. It is soluble in aliphatic hydrocarbons, i.e., petroleum ether, hexane, heptane, etc., aromatic hydrocarbons, such as benzene, xylene, toluene, mineral oils, etc.

The solid product analyzed 7.1% for nitrogen corresponding to 43.7% by weight of the product as decene graft on the pyrrolidone moieties.

EXAMPLE X 125 grams of poly(N-vinyl piperidone), (1.0 mole), were dissolved in 300 grams of normal amyl alcohol and after the addition of 168 grams (1.0 mole) of α-dodecence and 14.6 grams (0.1 mole) of di-t-butyl peroxide, the mixture was heated and maintained at 120–130° C. for 10 hours. Then a second addition of 7.3 grams of peroxide (0.05 mole) was made and heating continued. The reaction mixture was cooled after a total of 16 hours and analyzed. It was found to contain 1.2% by weight of solution of unreacted α-dodecene, corresponding to 95.6% alkylation (graft) based on the amount of α-olefin charged.

After stripping the amyl alcohol and unreacted α-dodecene, a clear viscous fluid was obtained while hot which solidified on cooling to room temperature to a clear flexible solid. It is insoluble in water, but soluble in all other polar and non-polar solvents.

Based on the structural studies of the alkylated polymer and its thermally degraded products by VPC, IR, NMR and elemental analysis, the 90% of the piperidone moieties alkylated (grafted) on the average (calculated by the equation of Example 1) showed the following isomeric distribution of the alkyl groups:

| | Percent |
|---|---|
| 3-position of the piperidone moiety | 65–75 |
| 6-position of the piperidone moiety | 10–5 |
| α-Vinyl carbon atom of the piperidone moiety | 25–20 |

EXAMPLE XI

A 70/30 (by weight) copolymer of N-vinyl piperidone and vinyl acetate weighing 100 grams was dissolved in 200 grams of hexanol followed by the addition of 140 grams (0.5 mole) of α-eicosene and 7.3 grams (0.05 mole) of di-t-butyl peroxide. The mixture was heated to 120°–130° C. and maintained for 24 hours. The product, after cooling, was analyzed and found to contain 2.73% by weight of solution of unreacted α-eicosene corresponding to 91% alkylation based on the olefin charged.

After the removal of hexanol and volatiles in vacuum, a very viscous fluid was obtained while hot which solidified to a hard waxy solid at room temperature. The product is insoluble in water, but soluble in all non-polar solvents and partially soluble in the very polar solvents such as formamide, methanol, acetonitrile, etc.

EXAMPLE XII

Poly(N-vinyl-ε-caprolactam), (34.8 grams, 0.25 mole), was dissolved in 200 grams of hexanol and after the addition of 67.2 grams (0.3 mole) of α-hexadecene and 4.4 grams (0.03 mole) of di-t-butyl peroxide, the solution was heated and maintained at 120°–135° C. After 15 hours a second addition of peroxide (3.3 grams) was made and heating continued. At the completion of 26 hours (total time), the reaction mixture was cooled and analyzed for the α-olefin. The solution was found to contain 1.61% by weight of the solution of unreacted hexadecene corresponding to 95.5% alkylation based on hexadecene charged.

After stripping off the hexanol and volatile in vacuum, a very viscous fluid was obtained at room temperature. It is soluble in all aliphatic and aromatic hydrocarbons, esters, ketones, halogenated hydrocarbons and other polar and no-polar solvents.

Based on the structural studies of the alkylated polymer and its thermally degraded products by VPC, IR, NMR and elemental analysis, the 100% of the caprolactam moieties alkylated on the average (calculated by the equation of Example 1), showed the folowing isomeric distribution of the alkyl groups:

| | Percent |
|---|---|
| 3-position of the caprolactam moiety | 75–85 |
| 7-position of the caprolactam moiety | 20–15 |
| α-Vinyl carbon atom of the caprolactam moiety | 5–0 |

EXAMPLE XIII

An 80/20 (by weight) copolymer of N-vinyl-ε-caprolactam and ethyl acrylate weighing 50 grams was dissolved in 200 grams of normal amyl alcohol and after the addition of 42.0 grams (0.25 mole) of α-dodecene and 5.5 grams (0.038 mole) of di-t-butyl peroxide, the solution was heated and maintained at 125°–135° C. for 10 hours. The reaction mixture was then cooled and analyzed. It was found to contain 0.3% by weight of solution of unreacted dodecene, corresponding to 97.8% alkylation based on the α-dodecene used.

After removal of the amyl alcohol and volatiles in vacuum, a very viscous fluid was obtained while hot which solidified to a transparent flexible solid at room temperature. The product is insoluble in water, but soluble in all polar and non-polar solvents, including amides, alcohols, ketones, esters, aromatic and aliphatic hydrocarbons and halogenated hydrocarbons.

EXAMPLE XIV

PVP having a K-value of 30 (111 grams, 1.0 equivalent) was dissolved in 165 grams of anhydrous ethanol and then 25 grams (0.17 mole) of di-t-butyl peroxide added and the resulting solution transferred into a 1-liter stainless steel shaker bomb. 95 grams (3.4 mole) of ethylene were injected into the bomb. After shaking and maintaining the bomb for 24 hours at 125°–130° C., it was cooled to room temperature and a second addition of 25 grams of peroxide (0.17 mole) and 93 grams (3.3 mole) of ethylene made. Again the bomb was maintained at 125°–130° C. for 24 hours and cooled. For a third time, 25 grams of peroxide (0.17 mole) and 98 grams of ethylene (3.5 moles) were charged and the alkylation carried for another 24 hour (total of 75 grams (0.5 mole) of peroxide and 287 grams (10.3 mole) of ethylene). The bomb contents (white and cloudy) were then refluxed (clear at reflux) to remove any unreacted (but dissolved) ethylene. A material balance showed a gain of 274 grams of ethylene corresponding to an alkylation of 9.8 moles of ethylene per mole of PVP equivalent. When all the solvent and volatiles were removed, the residue (a clear yellow viscous fluid) analyzed 3.5% as nitrogen corresponding to 10.3 moles of ethylene alkylation per mole of PVP equivalent used.

The product is insoluble in water, but soluble in all aliphatic and aromatic hydrocarbons.

EXAMPLE XV

PVP K–30 (27.8 grams, 0.25 mole) was dissolved in 100 grams normal butanol and then 168 grams (1.0 mole) α-dodecene and 15.0 grams (0.1 mole) di-t-butyl peroxide were added and the resulting solution heated and maintained at reflux (115°–122° C.) Two more peroxide additions were made after 20 and 27 hours with 7.5 grams (0.05 mole) in each addition (total peroxide=30 grams or 0.2 mole). After a total of 52 hours reaction time the experiment was stopped and analyzed. The solution was found to contain 3.34% by weight of solution of unreacted α-dodecene, corresponding to 93.5% alkylation based on the amount of α-dodecene used.

The product after the removal of solvent was a colorless viscous fluid soluble in all aliphatic and aromatic hydrocarbons.

EXAMPLE XVI

A solution of 222 grams (2.0 moles) PVP K–30, 330 grams anhydrous ethanol and 8.0 grams (0.055 mole) di-t-butyl peroxide was prepared and the solution transferred into a one-liter stainless steel rocker bomb. Ethylene (70.0 grams) was then charged to the bomb and the bomb heated and maintained at 125°–130° C. for 13 hours with shaking. After cooling, the contents were discharged into a one-liter, four-necked flask and refluxed for an hour to remove any unreacted ethylene and then weighed. The resulting solution showed a gain of 60.0 grams in weight. The solution was then totally dried in vacuum oven and analyzed for nitrogen. It contained 10.0% nitrogen by weight of the dry product corresponding to 20.6% ethylene graft by the weight of the product.

The product yields a milky solution in water and is soluble in all the solvents in which the parent PVP is soluble.

EXAMPLE XVII

Into a one-liter flask were charged 111 grams (1.0 mole) of PVP K–30, 200 grams of methylisobutyl carbinol, 196 grams (1.0 mole) of α-tetradecene and 22 grams (0.15 mole) of di-tert-butyl peroxide. The mixture was heated and maintained at 125°–145° C. for 21 hours. After cooling to room temperature, the resulting solution was analyzed and found to contain 2.6% by weight of the solution of unreacted α-tetradecene corresponding to 93% alkylation (graft) based on the amount of α-tetradecene used. The product after the removal of the methyl isobutyl carbinol and volatiles was a yellow and very viscous fluid at room temperature. It is soluble in aliphatic and aromatic hydrocarbons.

Based on the structural studies of the alkylated polymer and its thermally degraded products by VPC, IR, NMR and elemental analysis, the 88.3% of the pyrrolidone moieties alkylated (grafted) on the average (calculated by the equation of Example 1) showed the following isomeric distribution of the alkyl groups:

| | Percent |
|---|---|
| 3-position of the pyrrolidone moiety | 75–80 |
| 5-position of the pyrrolidone moiety | 15–5 |
| α-Vinyl carbon atom of the pyrrolidone moiety | 10–15 |

EXAMPLE XVIII

Polyvinyl-5-methyl-pyrrolidone K–35 (125 grams, 1.0 mole) was dissolved in 200 grams of methyl isobutyl carbinol and then 280 grams (1.0 mole) of alpha-eicosene and 22 grams (0.15 mole) of di-t-butyl peroxide added. The resulting mixture was heated for 16 hours at 130–145° C. with agitation. The resulting solution was subjected to monomer analysis which indicated total absence of polyvinyl-5-methyl-pyrrolidone and only 4% by weight of the solution of unreacted alpha-eicosene corresponding to 91% alkylation based on the alpha-eicosene employed. The product solution was then stripped in vacuum and all volatiles removed. The 100% product obtained was a viscous light yellow fluid while hot, but which solidified into a hard, waxy solid. The product is soluble in aliphatic hydrocarbons such as mineral oils, etc., and in polar solvents such as alcohols, ketones, esters, etc., but insoluble in water.

Based on the structural studies of the alkylated polymer and its thermally degraded products by VPC, IR, NMR and elemental analysis, the 86.4% of the 5-methyl-pyrrolidone moieties alkylated (grafted) on the average (calculated by the equation of Example 1) showed the following isomeric distribution of the alkyl groups:

| | |
|---|---|
| 3-position of the 5-methyl-pyrrolidone moiety, percent | 80–90 |
| 5-position of the 5-methyl-pyrrolidone moiety | Negligible |
| α-Vinyl carbon atom of the 5-methyl-pyrrolidone, percent | 20–10 |

EXAMPLE XIX 100 grams of 70/30 by weight copolymer of N-vinyl caprolactam and N-vinyl-5-methyl-pyrrolidone were dissolved in 200 grams of hexanol and then 252 grams of alpha-octadecene (1.0 mole) and 22 grams of di-tertiary butyl peroxide added and the mixture heated with agitation for 24 hours at 125–145° C. The resulting solution contained 4.72% by weight of solution of unreacted alpha-octadecene which corresponds to 89% alkylation based on the alpha-octadecene used. After the removal of all volatiles in vacuum, the product obtained was a pale yellow viscous fluid at room temperature. The product is soluble in ethanol and higher alcohols and aliphatic and aromatic hydrocarbons, including mineral oils.

EXAMPLE XX

Into a two-liter, four-necked flask equipped with stirrer, thermometer and reflux condenser, there were charged 111 grams (1.0 mole) of PVP K–30 and 200 grams of methyl isobutyl carbinol, to yield a solution. To the solution were then added 395 grams (1.0 mole) of a mixture of alpha-olefins containing from 65–75% of $C_{22}$ to $C_{42}$ carbon atoms and having an average molecular weight of 395 (sold commercially by Gulf Oil Corporation as $C_{22}$+alpha - olefins) and 22 grams (0.15 mole) of di-tertiary butyl peroxide. The resulting mixture was heated for 16 hours at 130–140° C. The final solution contained 17.4% by weight of the solution of unreacted $C_{22}$+olefins corresponding to 68% alkylation based on the mixture of the olefins employed. After stripping all volatiles in vacuum, the product obtained was a viscous fluid while hot, but a waxy solid at room temperature. It is soluble in aliphatic and aromatic hydrocarbons and in higher alcohols such as hexanol, etc., but insoluble in water.

From the foregoing specification and illustrative working examples, it becomes clearly evident that by the process of the present invention the solubility of the alkylated polymeric N-vinyl lactams can be systematically controlled, both by the type of α-olefin used and the amount thereof, so that polymers which are still soluble in polar solvents, such as alcohols to polymers which are soluble in aliphatic hydrocarbons, mineral and lubricating oils can be obtained as well as polymers having intermediate degrees of solubility between polar and non-polar solvents. Thus, polymers with a low degree of alkylation are still soluble in ethanol, so that they can be formulated with "Freons" as aerosol hair sprays, but their sensitivity to moisture is reduced. For example, polymeric N-vinyl lactams which are alkylated to the extent of 15% to 30% ethylene, propylene or 1-butene by weight are soluble in anhydrous ethanol and can be formulated with "Freons" as aerosol hair sprays having increased moisture resistance. The films of such polymers are more flexible and less tacky under high humidity conditions than PVP itself or vinyl pyrrolidone/vinyl acetate copolymers. The flexibility increases and the tack at high humidity decreases as the percent of alkylation increases. These polymers can also be formulated into adhesives with superior properties because of their increased resistance to moisture.

The alkylated polymeric N-vinyl lactams, including those obtained by alkylation with lower alpha-olefins, are compatible at all levels with epoxy resins, polystyrene, polyvinyl acetate, and with copolymers of vinyl chloride and vinyl acetate.

The polymeric N-vinyl lactams when alkylated with α-olefins of from 8 to 42 carbon atoms yield lube-oil additives which not only improve the viscosity index of lubricating oils, but also impart thereto excellent sludge and corrosion inhibiting properties. Of particular utility in this regard are the alkylated homopolymers prepared by the alkylation of 0.5 equivalent of polyvinylpyrrolidone with 0.35 mole of α-eicosene, one equivalent of polyvinylpiperidone with one mole of α-dodecene, and 0.25 equivalent of polyvinyl caprolactam with 0.3 mole of α-hexadecene.

The alkylated polymeric N-vinyl lactams, i.e., homopolymers and copolymers of 60 mole percent of N-vinyl lactam and 40 mole percent of a monoethylenically unsaturated polymerizable monomer in which at least 25%–30% of the lactam moities contain at least one alkyl substitution of from 10 to 42 carbon atoms, display emollient properties, i.e., softening and soothing effect when applied to the skin and the appendages of the skin. In view of this characteristic, they are excellent additives to soaps and cosmetic preparations of the cleansing, conditioning and embellishing type which will impart a smooth texture as well as a softening and soothing effect to the skin and skin appendages. The homopolymers and copolymers can be used in place of, and in addition to, petroleum hydrocarbons, i.e., mineral oils, petrolatums and paraffin waxes. They are not only soluble in these petroleum hydrocarbons, but also soluble in other unctuous materials such as fatty acids; stearic, myristic oleic acids, etc.; glyceryl monostearate (Glycosterin); lanolin (wool fat); beeswax and other animal and vegetable waxes; higher alcohols, such as hexanol, myristyl alcohol, etc.; polyoxyalkylene glycols, e.g., polyoxyethylene glycol, polyoxypropylene glycol; methyl ethyl ketone, Cellosolve, butyrolactone, etc., which are employed in toiletry preparations of this type. They are readily emulsified by the usual reagents employed in toiletry manufacture. By virtue of this solubility, emulsifiability and broad compatibility with other components of the toiletry preparation, they substantially reduce or eliminate the drying tendency of mineral oils and petrolatums present in such preparations. The presence of the additive (alkylated polymer) in toiletry preparations containing paraffin wax eliminates the clogging of pores. Regardless whether the toiletry preparation contains any one or all of these petroleum hydrocarbons, vegetable oils, lanolin, and/or other unctuous components, or is free from such components, etc., the presence of the additive in such preparation imparts a much smoother texture to it with the attendant softening and soothing effect when applied to the skin and a softening effect when applied to skin appendages.

The amount of alkylated polymer that is employed to effect the desired results (smoother texture with softening and soothing effects) ranges from about 0.1% to about 50% by weight based on the total weight of the completed toiletry preparation. The alkylated polymers may be added at any stage of manufacture of cold creams, cleansing creams, emollient creams, finishing creams, skin-softening lotions, hand cleaners, lubricating creams, overnight creams, absorption-base creams, hand creams and lotions, foot creams, baby creams, baby skin oils; special creams, such as astringent creams, bleaching creams, acne creams; protective creams (industrial creams), lotion or aerosol skin protective coatings, aerosol bandage sprays, vanishing creams, foundation creams, brushless shaving creams, shaving preparations, after-shave lotions and sprays, medicated creams, deodorants and anti-perspirants, such as deodorant creams and lotions, roll-on deodorants, sunburn preventives, suntan preparations, paste or lotion rouges, cream rouges, massage oils, facial masks, depilatories, i.e., hair removers (epilating wax compositions) and hair removing creams, paste or lotion face makeup, face powders; eye makeup, i.e., eye shadows and eyebrow creams; fingernail creams and cleaners, hair bleaches and tints, cuticle softeners, hair conditioners, wave sets, hair dressings, hair brilliantines; hair oils, hair sprays, creams and shampoos, nail polish removers, lipsticks, perfume sticks, facial soaps, synthetic soap bars, antiseptic soaps (tincture of green soap), insect repellents, protective hand creams, waterless hand cleaners, dentifrice, pet shampoos, bath talcs, and the like. They are helpful in stabilizing aqueous foams in toiletry preparations such as soap bars, shaving creams, etc.

Toiletry preparations containing the alkylated polymer render the preparation smoother in texture and easier in application to the skin and its appendages (hair and nails). After application to the skin or scalp, the preparations leave the skin soft and pliable with a soothing effect which remains after the preparation is removed by washing with soap and water. After application to the hair, the preparation deposits a film which renders the hair smooth, soft, lustrous and alive-looking. The soft and smooth effects remain after washing with soap and water and enhance the manageability of the hair. After application of the nail preparations, the nails are smooth and the adjacent skin rendered soft and pliable with a soothing effect. The alkylated polymers are effective pigment dispersers and act as color receptors in rouges and lipsticks.

In hair preparations the presence of the alkylated polymer improves the softness, water repellency and manageability of the hair. In hair conditioners, the alkylated polymers may be added to creams, foams or gels and the resulting preparations pressurized with nitrogen, argon, or the usual liquefied fluoro-chloro-hydrocarbons.

In view of their solubility in hydrocarbons, mineral oils, etc., the alkylated polymers are particularly adaptable for use as hot melts alone or in combination with paraffin waxes as coatings for various fibrous materials. Extruded films from such alkylated polymers, either alone or with waxes and resins, may be composited to paper and other fibrous or textile materials. The alkylated polymers are compatible with a wide variety of resins, waxes, and polymers at room or elevated temperatures. They are useful as binders and saturants in hard board and particle board.

Polymers, in which at least 60% of the lactam moieties contain an alkyl group of from 8 to 42 carbon atoms, are useful for the protection of wires and cables in the form of outer jackets and sheets. Films or coatings of such alkylated polymers are also useful as liners for metal or fiber drums for shipping moist, dusty or corrosive products. They are also useful in electrical equipment such as in electric cable insulation, in potting dopes for capacitor elements, and as insulating coatings, sealing compounds, and in moisture-proofing coils, resistors and paper capacitors; as caulking compounds, spreader-sticker for insecticidal compositions, water-proofing sealants, adhesives, gum and resin plasticizers, paper coatings, and as dispersants for inks and dye pastes. They are useful in leather treatment, as dye assistants, dye stripping agents, textile water-proofing, textile warp size, and the like.

Emulsions of the alkylated polymers are especially useful in the impregnation of paper. When mixed in amounts ranging from about 1 to 3% by weight in light mineral oils, the alkylated polymers function effectively as penetrants in the removal of rusty and frozen nuts and bolts.

The alkylated polymers are especially adaptable in dye stripping, as pigment dispersants and protective colloids, temporary protective coatings, binders for detergent briquettes and as binders for tablets and as color dispersants in table coating. Films of the alkylated polymers, from aqueous dispersion or emulsion, are effective for spraying various plants so as to protect them during transplanting or prevent rapid transpiration during sunny and relatively warm winter months.

The alkylated polymers are useful in dispersing gums, resins and various types of polymers. They are particularly adaptable in engine oils as sludge dispersers, and as bonding agents for paper, plastics and textile fabrics. They are very useful as anti-redeposition agents in detergents, as detergent hydrotropes and/or pacifiers, in dry cleaning detergents, foam stabilizers for shampoos, stabilizers for high density and low density liquid detergents, foam stabilizers for mist drilling of oil or gas wells, latex stabilizers, hydraulic fluid emulsions stabilizers, suspending agents and protective colloids for polymer emulsions and in emulsion polymerization reactions, inhibitors for clay hydration, slushing oil corrosion inhibitors, engine oil rust inhibitors, complexing agents for liquid-liquid extraction, dye receptors for polypropylene, dye fixing agents, pigment dispersants and protective colloids in pigment printing, fluidizing agents for paper coating slurries, pitch dispersant; adhesives in place of starch, casein, synthetic latices and the like; anti-static agents for polystyrene, polyethylene, polypropylene and other plastics, tackifiers for polyolefins and other plastics, flexibilizing agents for phenolic and other thermo-setting resins, dispersants and gloss improvers in floor wax polishes, thickening agents in non-aqueous systems, as membranes for desalting and filtration, as adhesion promoters for paperboard to nylon and as dye receptors for Creslan. They are useful as additives to natural and synthetic waxes to lower melt viscosity, improve dispersibility, flexibility or gloss. They are useful as ink acceptors for surface printing of high density polyethylene bottles, absorbents for tobacco tars in cigarette filters, absorbents for toxic gases and vapors; complexing agents for dyestuffs, phenolic compounds and heavy metal ions; thickeners for petroleum oils and oil based paints; flocculating agents in sewage treatments, as coatings for adhesive tapes and as components in adhesive hot melts, melting point depressants for natural and synthetic resins, as reinforcing agents for glues and as reducers of the hydrophilic character of polar resins.

The alkylated polymers are excellent dye receptors for polyolefin fibers such as polyethylene, polypropylene and polybutene. They are also excellent for sizing polypropylene filament and spun yarns in view of their good adhesive properties on polypropylene surfaces. They add strength and good dyeing properties when employed with rayon, both viscose and acetate. They are excellent sizers for glass fibers since they have the adhesion due to the N-vinyl lactam moieties but better lubricity because of the alkyl substituents. They are better soil suspending agents than the corresponding unalkylated polymers in synthetic detergents. They are especially useful in the demulsification of crude oil emulsions. They are useful as soil dispersing agents for synthetic fibers. In the textile industry, they are useful as adhesives, anti-static agents, lubricants, dye assistants, dye leveling agents and as filament spinning finishes. They are also useful as tackifiers, plasticizers, flocculators of ore fines, etc., as gelling agents and as beverage clarifiers.

The alkylated polymers display dispersing and detergent properties when incorporated into petroleum products such as kerosene, fuel oils, jet fuels and other combustible hydrocarbon liquids. They readily disperse gums, resins (asphaltenes) in such products.

The alkylated polymers are also useful as mold release lubricants, an anti-tack and anti-block agents, as lubricants and anti-static agents for films and textile fibers, and as flattening, softening and sizing agents for textiles. They are compatible with petroleum resins yielding compositions which are useful in water-proofing, pipe coating, and in concrete curing compounds to insure the deposition of a water-proof membrane. In carbon paper, the alkylated polymers serve as a vehicle for carrying the color and prevent the ink from soaking completely into the paper. Polyethylene containing sodium bicarbonate and the alkylated polymers in which the lactam units contain alkyl groups of from 6 to 10 carbon atoms can be extruded coaxially with a core to give a foam-sheathed cable. They are especially useful as cell control agents in polyurethane foam.

The alkylated polymers form halogen adducts with elemental iodine, iodine monochloride and iodine monobromide. The iodine adducts are prepared by gently heating the alkylated polymer until it melts and with constant stirring adding elemental iodine or a solution of elemental iodine in alcohol or carbon tetrachloride or a mixture thereof. From 2 to 12% of iodine by weight of polymer may be incorporated to the molten polymer. The resulting iodine adduct is soluble in a pharmaceutical grade mineral oil and other unctuous materials. The iodine adduct may be incorporated in powders, ointments, salves, suppositories, and toiletry preparations (cosmetics and soaps) to yield antiseptic and germicidal compositions which impart a soft, smooth and softening effect to the skin.

The alkylated polymers are useful additives to automobile polishes to increase gloss and as rust inhibitors in priming and finishing paints for metals. The alkylated polymers are readily chlorinated by conventional procedures to yield a new and useful class of polymers having fire-retarding properties.

The alkylated polymers when incorporated into nonanionic and anionic surfactants in amounts ranging from about 2 to 5% by weight of the surfactant, counteract the defatting tendencies of the surfactants and the accompanying chapping appearance when in contact with human skin, by leaving the skin soft and pliable with a soothing effect, which remains after several rinsings with water.

While the present specification has shown the alkylation of a large class of polymeric N-vinyl lactams, other N-vinyl lactam monomers may be homopolymerized or copolymerized with the aforementioned monoethylenically unsaturated polymerizable monomers in the aforestated proportions and the resulting polymers alkylated with a monohalo- polyhalo-α-olefin or an alpha-olefin of at least two carbon atoms. Such monomers include N-vinyl alkyl-substituted derivatives of lactams, for example, 4,4-dimethyl-2-pyrrolidone; 3,3-dimethyl-2-pyrrolidone; 3-3-ethyl-2-pyrrolidone; 3,5-dimethyl-2-pyrrolidone, 3-methyl-2-pyrrolidone; 4-methyl-2-pyrrolidone; 3,3,5-trimethyl-2-pyrrolidone; 5,6-dimethyl-2-piperidone; 4-ethyl-2-piperidone; 3-methyl-6-ethyl-2-piperidone; 3-methyl-2-piperidone; 4-methyl-2-piperidone; 3,6-dimethyl-2-caprolactam; 4,6-dimethyl-2-caprolactam; 4,7-dimethyl-2-caprolactam; 3-ethyl-2-caprolactam; 5-ethyl-2-caprolactam; 6-ethyl-2-caprolactam; 4-ethyl-6-methyl-2-caprolactam; 6-methyl-2-caprolactam; 4-methyl-6-ethyl-2-caprolactam; 3-methyl-2-caprolactam; 4-methyl-2-caprolactam; and 6-methyl-2-caprolactam. Despite the fact that some of these monomers contain an alkyl group in alpha- and/or omega-positions to the carbonyl, the alpha-vinyl carbon atom of the lactam moiety will nevertheless be alkylated to some degree. Any carbon atom in the alpha- or omega-position to the carbonyl which is unsubstituted by a lower alkyl group will also be alkylated.

From the foregoing specification, it is evident that by the process of the present invention alkylated polymers of heterocyclic N-vinyl monomers are obtained in which at least 2.5% of the heterocyclic N-vinyl moieties are randomly substituted by an alkyl group of at least 2 carbon atoms and up on at least one of the carbon atoms alpha and omega to the carbonyl and alpha-vinyl carbon atom of the heterocyclic moiety. The alkylated polymers of heterocyclic N-vinyl monomers provided by the present invention differ structurally from the polymeric N-vinyl-3-alkyl lactams obtained by the process disclosed in the application of A. Merijan and F. Grosser, Ser. No. 508,828, filed on Nov. 19, 1965, in that each and every α-position to the carbonyl in the lactam moiety of the latter polymers is always substituted by an alkyl group of from 6 to 42 carbon atoms. In other words, in each lactam moiety of the polymers prepared in accordance with the procedure of said application, the α-position to the carbonyl in each lactam moiety is 100% substituted by an alkyl of from 6 to 42 carbon atoms.

It is to be understood that in lieu of the foregoing N-vinyl 5-, 6- and 7-membered lactams, homopolymers of heterocyclic N-vinyl monomers such as N-vinyl succinimide, N-vinyl diglycolylimide, N-vinyl gultarimide, N-vinyl-3-morpholinone, N-vinyl-5-methyl-3-morpholinone, N-vinyl oxazolidone and of other heterocyclic N-vinyl monomers having a carbonyl functionality in the cyclic structure adjacent to the nitrogen atom thereof as well as copolymers of such heterocyclic N-vinyl monomers and monoethylenically unsaturated polymerizable comonomers listed heretofore in the stated proportions are also readily alkylated by the process of the present invention to yield polymeric products in which one or more of the carbon atoms alpha and omega to the carbonyl and alpha vinyl carbon atoms in the heterocyclic N-vinyl moieties contain at least one alkyl group of from 6 to 42 carbon atoms, and that such alkylated products have varying degrees of solubility in polar and non-polar solvents, and which are just as useful in the applications discussed above.

We claim:

1. Alkylated polymer of heterocyclic N-vinyl monomer, having a carbonyl function adjacent to the nitrogen in its heterocyclic moiety, selected from the group consisting of homopolymers of said monomer and copolymers of said monomer with 1 to 95 mole percent of a monoethylenically unsaturated polymerizable comonomer selected from the class consisting of acrylamides, acrylic acid and acrylic acid esters, acrylonitrile and methacrylonitrile, methacrylic acid and methacrylic acid esters, vinyl esters, vinyl ketones, vinyl pyridine, vinyl cyclohexane and styrene, the said polymer having an N-vinyl heterocyclic moiety selected from the class consisting of those having the following formulae:

(1)

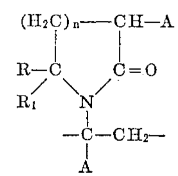

(2)

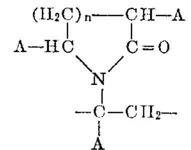

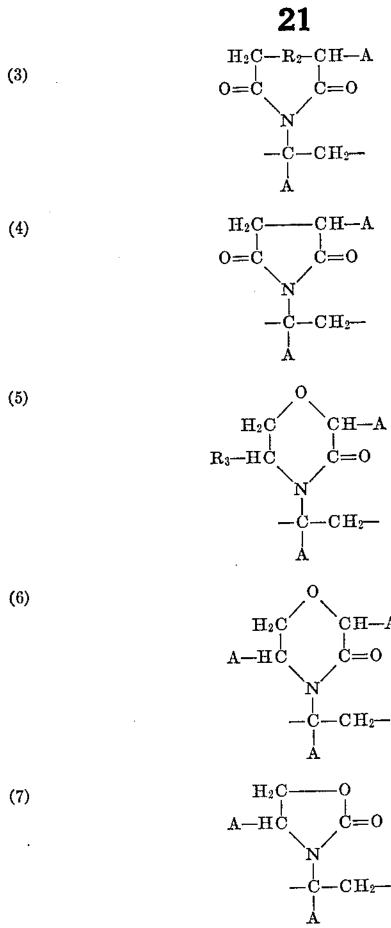

wherein R and $R_1$ are selected from the class consisting of hydrogen, methyl and ethyl, $R_2$ is selected from the group consisting of oxygen atom and $CH_2$ group, $R_3$ is selected from the class consisting of methyl and ethyl, $n$ is an integer of from 1 to 3, and wherein at least 5% of the said heterocyclic moieties in said polymer are substituted by the A's which are independently selected from the group consisting of hydrogen and alkyl of from 6 to about 180 carbon atoms and wherein at least one of the A's in said heterocyclic moiety in said polymer is alkyl of from 6 to about 180 carbon atoms.

2. Alkylated polymer of N-vinyl lactam selected from the group consisting of homopolymers of N-vinyl lactam and copolymers of said lactam with 1 to 95 mole percent of a monoethylenically unsaturated polymerizable comonomer selected from the class consisting of acrylamides, acrylic acid and acrylic acid esters, acrylonitrile and methacrylonitrile, methacrylic acid and methacrylic acid esters, vinyl esters, vinyl ketones, vinyl pyridine, vinyl cyclohexane and styrene, the said polymer having an N-vinyl lactam moiety selected from the class consisting of those having the following formulae:

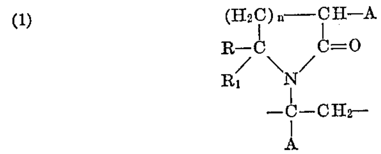

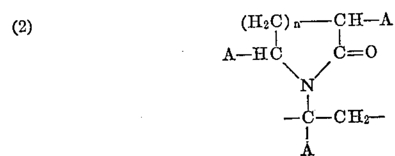

whereinIR and $R_1$ are selected from the group consisting of hydrogen, methyl and ethyl, $n$ is an integer of from 1 to 3, and wherein at least 5% of the said lactam moieties in said polymer are substituted by the A's which are independently selected from the group consisting of hydrogen and alkyl of from 6 to about 180 carbon atoms, and wherein at least one of the A's in said lactam moiety in said polymer is alkyl of from 6 to about 180 carbon atoms.

3. Alkylated polymer of N-vinyl lactam selected from the group consisting of homopolymers of N-vinyl lactam and copolymers of said lactam with 1 to 95 mole percent of a monoethylenically unsaturated polymerizable comonomer, selected from the class consisting of acrylamides, acrylic acid and acrylic acid esters, acrylonitrile and methacrylonitrile, methacrylic acid and methacrylic acid esters, vinyl esters, vinyl ketone, vinyl pyridine, vinyl cyclohexane and styrene, the said polymer having an N-vinyl lactam moiety of the formula:

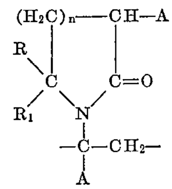

wherein R and $R_1$ are selected from the group consisting of hydrogen, methyl and ethyl, $n$ is an integer of from 1 to 3 and wherein at least 5% of the said lactam moieties in said polymer are substituted by the A's which are independently selected from the group consisting of hydrogen and alkyl of from 6 to about 180 carbon atoms and wherein at least one of the A's of the said lactam moiety in said polymer is alkyl of from 6 to about 180 carbon atoms.

4. Alkylated polymer of N-vinyl lactam selected from the group consisting of homopolymers of an N-vinyl lactam and copolymers of said lactam with 1 to 95 mole percent of a monoethylenically unsaturated polymerizable comonomer selected from the class consisting of acrylamides, acrylic acid and acrylic acid esters, acrylonitrile and methacrylonitrile, methacrylic acid and methacrylic acid esters, vinyl esters, vinyl ketones, vinyl pyridine, vinyl cyclohexane and styrene, the said polymer having an N-vinyl lactam moiety of the formula:

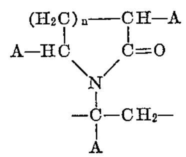

wherein $n$ is an integer of from 1 to 3 and wherein at least 5% of the said lactam moieties in said polymer are substituted by the A's which are independently selected from the group consisting of hydrogen and alkyl of from 6 to about 180 carbon atoms and wherein at least one of the A's of the said lactam moiety in said polymer is alkyl of from 6 to about 180 carbon atoms.

5. Alkylated polymer of N-vinyl lactam selected from the group consisting of homopolymers of an N-vinyl lactam and copolymers of said lactam with 1 to 95 mole percent of a monoethylenically unsaturated polymerizable comonomer selected from the class consisting of acrylamides, acrylic acid and acrylic acid esters, acrylonitrile and methacrylonitrile, methacrylic acid and methacrylic acid esters, vinyl esters, vinyl ketones, vinyl pyridine, vinyl cyclohexane and styrene, the said polymer having an N-vinyl lactam moiety of the formula:

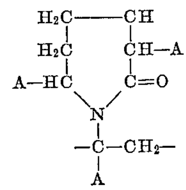

wherein at least 5% of the said lactam moieties in said polymer are substituted by the A's which are independently selected from the group consisting of hydrogen and alkyl of from 6 to about 180 carbon atoms and wherein at least one of the A's of the said lactam moiety in said polymer is alkyl of from 6 to about 180 carbon atoms.

6. Alkylated polymer of N-vinyl lactam selected from the group consisting of homopolymers of an N-vinyl lactam and copolymers of said lactam with 1 to 95 mole percent of a monoethylenically unsaturated polymerizable comonomer selected from the class consisting of acrylamides, acrylic acid and acrylic acid esters, acryonitrile and methacrylonitrile, methacrylic acid and methacrylic acid esters, vinyl esters, vinyl ketones, vinyl pyridine, vinyl cyclohexane and styrene, the said polymer having an N-vinyl lactac moiety of the formula:

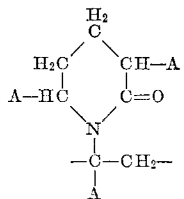

wherein at least 5% of the said lactam moieties in said polymer are substituted by the A's which are independently selected from the group consisting of hydrogen and aklyl of from 6 to about 180 carbon atoms and wherein at least one of the A's of the said lactam moiety in said polymer is alkyl of from 6 to about 180 carbon atoms.

7. Alkylated polymer of N-vinyl lactam selected from the group consisting of homopolymers of N-vinyl lactam and copolymers of said lactam with 1 to 95 mole percent of a monoethylenically unsaturated polymerizable comonomer selected from the class consisting of acrylamides, acrylic acid and acrylic acid esters, acrylonitrile and methacrylonitrile, methacrylic acid and methacrylic acid esters, vinyl esters, vinyl ketones, vinyl pyridine, vinyl cyclohexane and styrene, the said polymer having an N-vinyl lactam moiety of the formula:

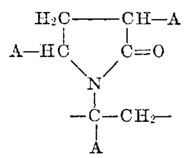

wherein at least 5% of the said lactam moieties in said polymer are substituted by the A's which are independently selected from the group consisting of hydrogen and alkyl of from 6 to about 180 carbon atoms and wherein at least one of the A's of the said lactam moiety in said polymer is alkyl of from 6 to about 180 carbon atoms.

8. Alkylated homopolymer according to claim 3 wherein the homopolymer of the N-vinyl lactam consists essentially of recurring structural units having the formula:

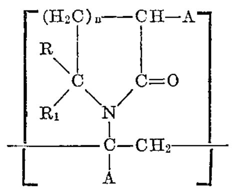

wherein R and $R_1$ are selected from the group consisting of hydrogen, methyl and ethyl, $n$ is an integer of from 1 to 3 and wherein at least 5% of the said lactam moieties in said polymer are substituted by the A's which are independently selected from the group consisting of hydrogen and alkyl of from 6 to about 180 carbon atoms, and wherein at least one of the A's is alkyl of from 6 to about 180 carbon atoms.

9. Alkylated homopolymer according to claim 4 wherein the homopolymer of the N-vinyl lactam consists essentially of recurring structural units having the formula:

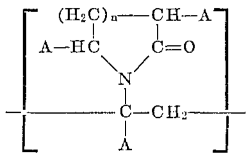

wherein $n$ is an integer of from 1 to 3 and wherein at least 5% of the said lactam moieties in said polymer are substituted by the A's which are independently selected from the group consisting of hydrogen and alkyl of from 6 to about 180 carbon atoms, and wherein at least one of the A's is alkyl of from 6 to about 180 carbon atoms.

10. Alkylated homopolymer according to claim 5 wherein the homopolymer of the N-vinyl lactam consists essentially of recurring structural units having the formula:

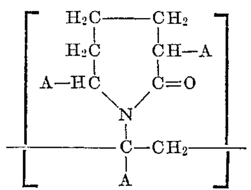

wherein at least 5% of the said lactam moieties in said polymer are substituted by the A's which are independently selected from the group consisting of hydrogen and alkyl of from 6 to about 180 carbon atoms, and wherein at least one of the A's is alkyl of from 6 to about 180 carbon atoms.

11. Alkylated homopolymer according to claim 6 wherein the homopolymer of the N-vinyl lactam consists essentially of recurring structural units having the formula:

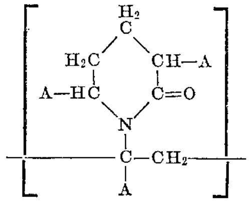

wherein at least 5% of the said lactam moieties in said polymer are substituted by the A's which are independently selected from the group consisting of hydrogen and alkyl of from 6 to about 180 carbon atoms, and wherein at least one of the A's is alkyl of from 6 to about 180 carbon atoms.

12. Alkylated homopolymer according to claim 7 wherein the homopolymer of the N-vinyl lactam consists essentially of recurring structural units having the formula:

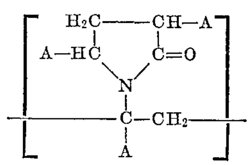

wherein at least 5% of the said lactam moieties in said polymer are substituted by the A's which are independently selected from the group consisting of hydrogen and alkyl of from 6 to about 180 carbon atoms, and wherein at least one of the A's is alkyl of from 6 to about 180 carbon atoms.

13. Alkylated homopolymer of N-vinyl pyrrolidone having an N-vinyl pyrrolidone moiety of the formula:

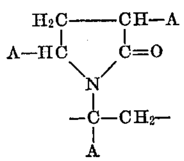

wherein on the average 62% of the pyrrolidone moieties in said homopolymer are substituted by the A's which are independently selected from the group consisting of hydrogen and alkyl of 20 carbon atoms, and wherein at least one of the A's in said pyrrolidone moiety in said homopolymer is alkyl of 20 carbon atoms.

14. Alkylated homopolymer of N-vinyl pyrrolidone having an N-vinyl pyrrolidone moiety of the formula:

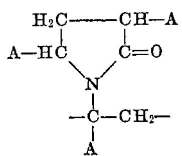

wherein on the average 65.4% of the pyrrolidone moieties in said homopolymer are substituted by the A's which are independently selected from the group consisting of hydrogen and alkyl having an average of 16.6 carbon atoms and wherein at least one of the A's in said pyrrolidone moiety in said homopolymer is alkyl having an average of 16.6 carbon atoms.

15. Alkylated homopolymer of N-vinyl pyrrolidone having an N-vinyl pyrrolidone moiety of the formula:

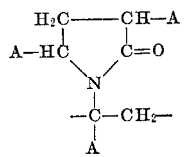

wherein on the average 49.5% of the pyrrolidone moieties in said homopolymer are substituted by the A's which are independently selected from the group consisting of hydrogen and alkyl of 10 carbon atoms, and wherein at least one of the A's in said pyrrolidone moiety in said homopolymer is alkyl of 10 carbon atoms.

16. Alkylated homopolymer of N-vinyl pyrrolidone having an N-vinyl pyrrolidone moiety of the formula:

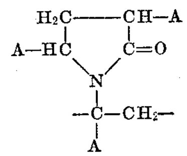

wherein on the average 43.7% of the pyrrolidone moieties in said homopolymer are substituted by the A's which are independently selected from the group consisting of hydrogen and alkyl of 10 carbon atoms, and wherein at least one of the A's in said pyrrolidone moiety in said homopolymer is alkyl of 10 carbon atoms.

17. Alkylated homopolymer of N-vinyl piperidone having an N-vinyl piperidone moiety of the formula:

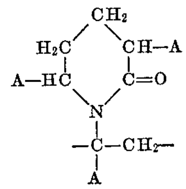

wherein on the average 90% of the piperidone moieties in said homopolymer are substituted by the A's which are independently selected from the group consisting of hydrogen and alkyl of 12 carbon atoms, and wherein at least one of the A's in said piperidone moiety in said homopolymer is alkyl of 12 carbon atoms.

18. The process of preparing alkylated polymers of heterocyclic N-vinyl monomers, having a carbonyl function adjacent to the nitrogen in its heterocyclic moieties, which comprises heating one mole of a polymer selected from the group consisting of homopolymers of heterocyclic N-vinyl monomer and copolymers of said monomer and 1 to 95 mole percent of a monoethylenically unsaturated polymerizable comonomer selected from the class consisting of acrylamides, acrylic acid and acrylic acid esters, acrylonitrile and methacrylonitrile, methacrylic acid and methacrylic acid esters, vinyl esters, vinyl ketones, vinyl pyridine, vinyl cyclohexane and styrene, with 0.05 to 10 moles of an $\alpha$-olefin of from 2 to about 180 carbon atoms in solution of an organic solvent common to said polymer and $\alpha$-olefin in the presence of 0.025 to 0.30 moles of an organic peroxide catalyst per mole of said $\alpha$-olefin at a temperature ranging from 100° to 200° C., the said heterocyclic N-vinyl monomers being selected from the class consisting of N-vinyl lactam, N-vinyl succinimide, N-vinyl diglycolylimide, N-vinyl glutarimide, N-vinyl 3-morpholinone and N-vinyl oxazolidone.

19. The process of preparing alkylated polymeric N-vinyl lactams which comprises heating one mole of a polymeric N-vinyl lactam selected from the group consisting of homopolymers of N-vinyl lactam and copolymers of said lactam and 1 to 95 mole percent of a monoethylenically unsaturated polymerizable comonomer, selected from the class consisting of acrylamides, acrylic acid and acrylic acid esters, acrylonitrile and methacrylonitrile, methacrylic acid and methacrylic acid esters, vinyl esters, vinyl ketones, vinyl pyridine, vinyl cyclohexane and styrene, with 0.05 to 10 moles of an $\alpha$-olefin of from 2 to about 180 carbon atoms in solution of an organic solvent common to said polymeric N-vinyl lactam and $\alpha$-olefin in the presence of 0.025 to 0.30 mole of an organic peroxide catalyst per mole of said $\alpha$-olefin at a temperature ranging from 100° to 200° C.

20. The process of preparing alkylated homopolymer of N-vinyl lactam which comprises heating one mole of a homopolymer of N-vinyl lactam with 0.05 to 10 moles of an $\alpha$-olefin, of from 2 to about 180 carbon atoms in solution of an organic solvent common to said homopolymeric N-vinyl lactam and $\alpha$-olefin in the presence of 0.025 to 0.30 mole of an organic peroxide catalyst per mole of said $\alpha$-olefin at a temperature ranging from 100° to 200° C.

21. The process according to claim 20 wherein the homopolymer of N-vinyl lactam is polyvinyl pyrrolidone.

22. The process according to claim 20 wherein the homopolymer of N-vinyl lactam is polyvinyl piperidone.

23. The process according to claim 20 wherein the homopolymer of N-vinyl lactam is polyvinyl caprolactam.

24. The process according to claim 20 wherein the homopolymer of N-vinyl lactam is polyvinyl-5-methyl-2-pyrrolidone.

25. The process according to claim 19 wherein the copolymer of said lactam consists of 60 mole percent of N-vinyl-2-pyrrolidone and 40 mole percent of vinyl acetate.

References Cited

UNITED STATES PATENTS

| | | | |
|---|---|---|---|
| 2,667,473 | 1/1954 | Morner et al. | 260—88.3 |
| 2,821,519 | 1/1958 | Glickman | 260—88.3 |
| 2,982,762 | 5/1961 | Voeks et al. | 260—88.1 |
| 3,174,955 | 5/1965 | Black | 260—88.3 |

JOSEPH L. SCHOFER, *Primary Examiner.*

HARRY WONG, Jr., *Assistant Examiner.*

U.S. Cl. X.R.

117—122, 138.8, 139.5, 155; 167—85, 87, 87.1, 88, 89, 90, 91, 92, 94; 252—50, 51.5, 52, 54.6, 56; 260—28.5, 32.4, 32.6, 32.8, 33.2, 33.4, 33.6, 33.8, 47, 77., 85.7, 80.3, 85.5. 86.1, 86.3, 87.1, 87.5, 88.1, 88.3, 93.5, 93.7, 94.9, 239.3, 326.5, 875, 878, 882, 885, 886